US010421104B1

(12) United States Patent
Newmeister

(10) Patent No.: US 10,421,104 B1
(45) Date of Patent: Sep. 24, 2019

(54) AUTOMATIC SEAM FITTER ATTACHMENT FOR WELDER

(71) Applicant: NewCon, LLC, Tulsa, OK (US)

(72) Inventor: John Newmeister, Tulsa, OK (US)

(73) Assignee: NewCon, LLC, Tulsa, OK (US)

( * ) Notice: Subject to any disclaimer, the term of this patent is extended or adjusted under 35 U.S.C. 154(b) by 0 days.

(21) Appl. No.: 16/420,895

(22) Filed: May 23, 2019

Related U.S. Application Data

(62) Division of application No. 15/842,556, filed on Dec. 14, 2017, now Pat. No. 10,307,797.

(60) Provisional application No. 62/442,166, filed on Jan. 4, 2017.

(51) Int. Cl.
| | |
|---|---|
| *B23K 37/00* | (2006.01) |
| *B08B 1/00* | (2006.01) |
| *B08B 1/04* | (2006.01) |
| *B23K 37/04* | (2006.01) |
| *A46B 13/02* | (2006.01) |
| *B23K 9/025* | (2006.01) |
| *B23K 37/02* | (2006.01) |

(52) U.S. Cl.
CPC .............. *B08B 1/008* (2013.01); *A46B 13/02* (2013.01); *B08B 1/002* (2013.01); *B08B 1/04* (2013.01); *B23K 37/0408* (2013.01); *A46B 2200/3093* (2013.01); *B23K 9/025* (2013.01); *B23K 37/0294* (2013.01)

(58) Field of Classification Search
CPC ................ B23K 37/0282; B23K 37/02; B23K 37/0211; B23K 37/0217; B23K 9/02; B62B 9/16; B62J 2099/0066; B25J 11/006; B60B 19/006
See application file for complete search history.

(56) References Cited

U.S. PATENT DOCUMENTS

| 2,694,164 | A | | 11/1954 | Geppelt | |
|---|---|---|---|---|---|
| 2,740,643 | A | * | 4/1956 | Gordon | B62B 9/16 280/47.38 |
| 4,392,604 | A | | 7/1983 | Sears | |
| 5,932,123 | A | * | 8/1999 | Marhofer | B23K 9/12 219/130.01 |
| 9,776,272 | B2 | * | 10/2017 | Einav | B23K 37/0211 |
| 2009/0057373 | A1 | * | 3/2009 | Darzi | B23K 26/032 228/18 |
| 2009/0078484 | A1 | * | 3/2009 | Kocijan | B60L 13/04 180/167 |
| 2011/0210110 | A1 | | 9/2011 | Dearman et al. | |
| 2015/0336625 | A1 | * | 11/2015 | Beard, III | B62D 61/10 180/22 |

\* cited by examiner

*Primary Examiner* — Erin B Saad
(74) *Attorney, Agent, or Firm* — Gable Gotwals

(57) ABSTRACT

Embodiments of an automatic seam fitter attachment for use with an automatic welding machine are designed to automate the plate edge cleaning, tight seam fitting, and tacking or welding of metal lapped or butted plates. The seam fitter attachment can be used on any product or in any industry where metal lap or butted plates seam together. The attachment may be provided with a power cleaning brush that cleans the edges of the plates and mechanically forces plate tightness as they are being tacked or welded.

15 Claims, 5 Drawing Sheets

US 10,421,104 B1

AUTOMATIC SEAM FITTER ATTACHMENT FOR WELDER

CROSS-REFERENCE TO CO-PENDING APPLICATIONS

This application is a divisional application of U.S. patent application Ser. No. 15/842,556, filed Dec. 14, 2017, which was a conversion of U.S. Provisional Application No. 62/442,166, filed Jan. 4, 2017, the contents of which are hereby incorporated by reference in its entirety.

BACKGROUND OF THE INVENTION

1. Field of the Invention

Embodiments of this disclosure relate to an attachment device to a tractor welder to automate the cleaning, fitting, tacking or welding of metal lapped or butted plates.

2. Description of the Related Art

Current technology for cleaning, fitting and welding lapped or butted plates is generally done by placing one plate on top of another for lapped plates or by laying them beside each other for butted plates then joining them in a seam, adjusting the lapped or butted seam dimensions and tack welding or holding the plates together to form a seam. This method uses a manual system of hand held power brushes or grinders for plate cleaning. This method also uses shims, wedges, pins, key plates, bull pins, u-bars, bars, hammers, hold downs, magnets, and other accessories to bring plates together for alignment and tightness to allow tack welding in a down flat or horizontal welding position (e.g., AWS/ASME 1G/1F/2F positions; ISO PA/PB positions). This method or process is very labor intensive, has high material cost, and is time consuming. In many cases this process is repeated many times to form a large surface of lapped or butted plates.

Once the initial tack welding or holding in place of the plates is accomplished the plates need to be edge cleaned for quality welds and quite often need to be held tightly together by either continuous or intermittent welds. The process of pulling or aligning the plates tightly together is accomplished using a manual system of shims, wedges, pins, key plates, bull pins, u-bars, bars, hammers, hold downs, magnets, and other accessories, some of which are tack welded or welded to the plates to be aligned. This system is very labor intensive, has high material cost, and is time consuming. The tighter the tolerance of plate fit-up or alignment, the better the results in higher quality welding, and less inspection and testing.

Currently there are automatic tractor welding machines which are used to weld these seams together, either continuously or intermittently, but there is a need to automate the process of plate edge cleaning, bring plates together for alignment, and tight fitting of the plates for welding of these plate seams in one process.

The present invention addresses this need by providing an attachment device to a tractor welder which provides for cleaning plate edges, fitting, and welding, either continuously or intermittently, of lapped or butted weld seams. Optionally, the attachment device can be used to clean plate edges, join plates with tight laps or butt seams and tack welding plates while not continuously welding them together.

This attachment device is developed to reduce labor input and material costs and to shorten the time required to perform plate edge cleaning, tight seam fitting, and tacking or welding. Additionally, this attachment device provides for improving weld quality, accuracy, safety, inspection, and testing in lapped or butt welded plates.

Embodiments of the attachment device provide for plate edge cleaning, tight seam fitting, tacking or welding of metal lap or butt welded seams.

SUMMARY OF THE INVENTION

Embodiments of this disclosure provide an attachment device to automate the plate edge cleaning, tight seam fitting, tacking or welding of metal lapped or butted plates. The embodiments can be used on any product or in any industry where metal lap or butted plates seam together. In some embodiments, the attachment device is used to automate plate edge cleaning, tight fitting, tacking or welding of plates with either manual or automated welding processes.

The attachment device moves along the top of a plate or plates, is propelled manually or by a drive mechanism, may use power tools for plate edge cleaning, and uses permanent or electromagnets to align and hold metal plates tightly together while they are being tacked or welded. In embodiments, the device can align and hold a lap or butted seam in any position, flat, vertical, horizontal, or overhead. The device may be manually or mechanically moved along a plate or plates to fit, tack or weld in a down flat or horizontal welding position (e.g., AWS/ASME 1G/1F/2F positions; ISO PA/PB positions). The attachment device uses one or more permanent or electromagnets to mechanically force tight plate alignment prior to them being tacked or welded.

The attachment device can be adjusted so it can align different profiles such as lapped, or butted plates of any plate thickness.

DETAILED DESCRIPTION OF THE PREFERRED EMBODIMENT

Figure 1:
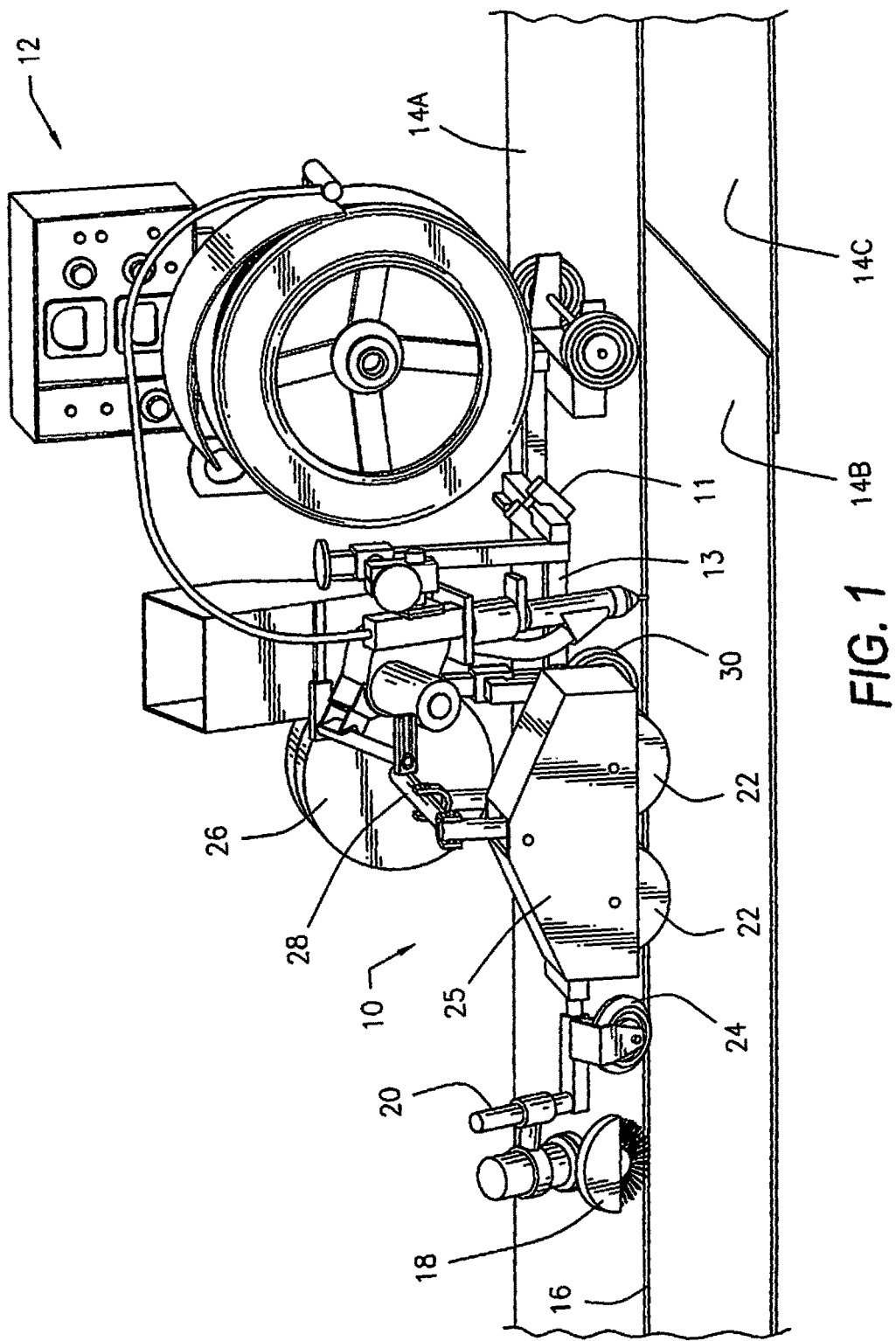
FIG. 1 is a left side perspective view of a seam fitter that is constructed in accordance with a preferred embodiment of the present invention shown attached to an automatic welder that is tacking or welding metal plates together.

Embodiments of a seam fitter of this disclosure are configured for attachment to a welding tractor. The seam fitter (or seam fitter attachment device) includes at least one magnetic wheel located between a forward and a rearward end of the attachment device and a lever arm connected to the magnetic wheel. The magnetic wheel may include a permanent magnet, electromagnet, or some combination of the two. In some embodiments, there is one magnetic wheel. In other embodiments, there is a pair of magnetic wheels. In yet other embodiments, there may be two or more pairs or wheels. The magnetic wheel along with the lever arm is effective for raising a lower plate upwards toward a top plate, where the plates overlap, or for flushing up two plates for alignment in a butt-welding application.

The lever arm is configured to apply a vertically upward force to the magnetic wheel so that a portion of a metal plate located below the wheel can raise up. A counterweight may be used and adjusted to provide the right amount of vertical upward force. For example, the magnetic wheel may be resting on a bottom plate with a bottom plate being magnetically attracted and raised up toward the top plate.

The seam fitter may also include a vertically adjustable middle wheel located on a side of the frame opposite that of the magnetic wheel. This wheel may place a vertically downward force on the metal plate that it is in contact with. For example, the middle wheel may rest on the top plate and force it toward the bottom plate. A similar principle applies for butt-welding, the middle wheel forcing one plate downward and the magnetic wheel lifting the other plate upward for alignment with one another in a horizontal plane.

In embodiments, the seam fitter may include a housing that contains at least a portion of the magnetic wheel. The housing also may contain a brush arranged opposite the magnetic wheel to engage and clean a periphery of the magnetic wheel as the wheel rotates. The seam fitter may also include a wire brush located at the forward end of the frame. This brush may be a powered brush or may rotate as the seam fitter moves forward.

Embodiments of method of automatically fitting a seam between two metal plates for welding includes moving the seam fitter along a top of two metal plates to be welded together along a seam when lapped welded or moving across both plates when butt welded. During the moving, the one or more magnetic wheels is in contact with one of the two metal plates and not the other plate of the two metal plates.

The method may also include aligning the metal plates. The seam fitter may be adjusted so that it can align different profiles such as lapped or butted plates and different thicknesses of plates. In some embodiments, the bottom plate is magnetically attracted upward toward the top plate. In other embodiments, a portion of one plate is aligned in a horizontal plane by adjusting the vertically upward force on the magnetic wheel and a portion of other plate is aligned in that plane by adjusting a vertically downward force. The vertically downward force may be applied through the vertically adjustable wheel. aligning the two metal plates into proper alignment with one another by adjusting a counter weight connected to the lever arm.

The magnetic wheel may be cleaned by brushing a periphery of the magnetic wheel during the moving of the seam fitter. The method may also include cleaning the seam between the two metal plates during the moving of the seam fitter. The cleaning may be accomplished by a wire brush located at the forward end of the frame.

Figure 2:
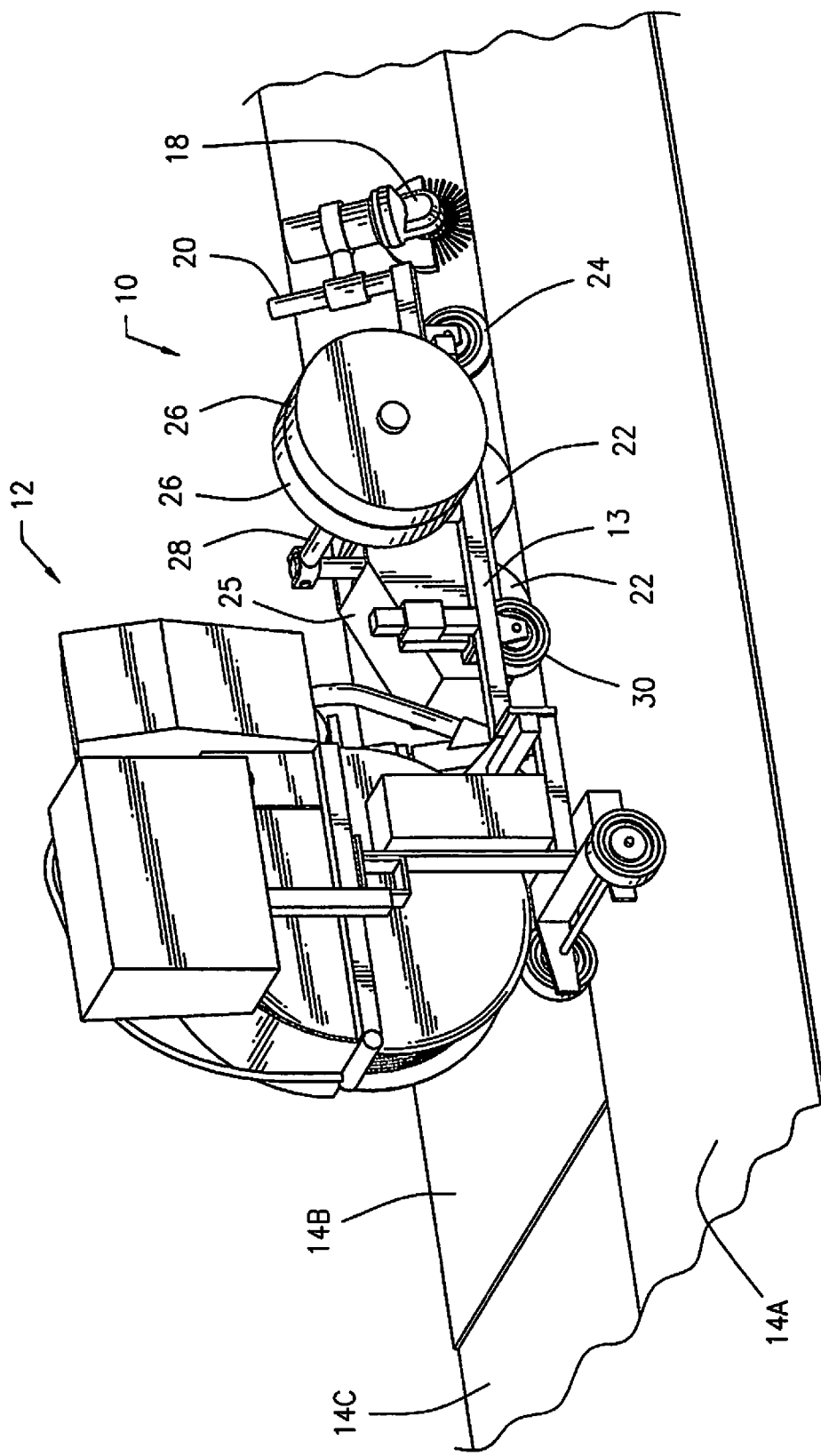
FIG. 2 a right side perspective view of the seam fitter and welder of FIG. 1.
Figure 3:
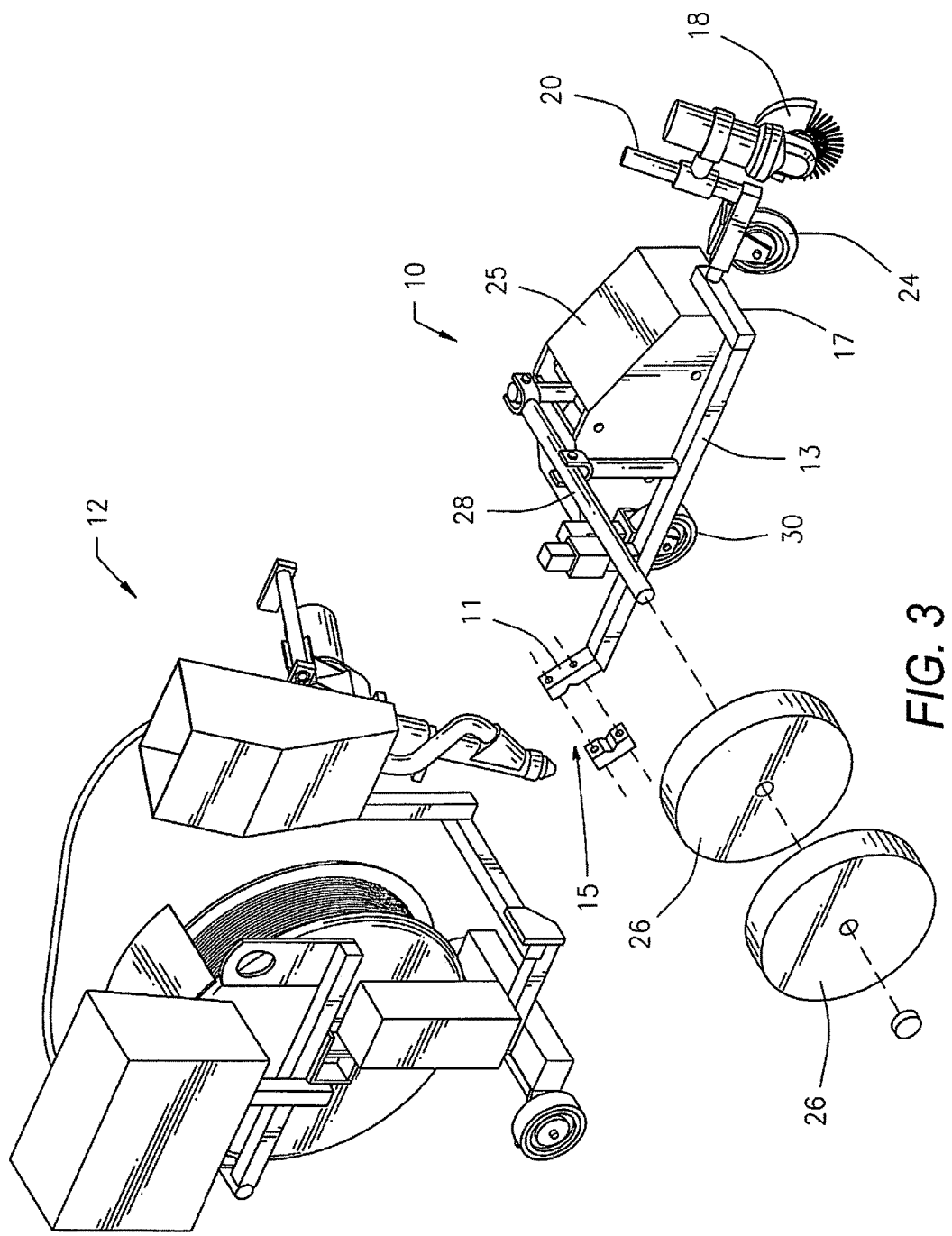
FIG. 3 is an exploded view of the seam fitter attachment shown removed from the automatic welding machine.

Referring now to the drawings and initially to FIGS. 1, 2 and 3, there is illustrated a seam fitter 10 that is constructed in accordance with a preferred embodiment of the present invention. The seam fitter 10 is shown attached to an automatic welding machine 12 that is welding metal plates 14A, 14B, and 14C together in a down flat or horizontal welding position (e.g., AWS/ASME 1G/1F/2F positions; ISO PA/PB positions). The attachment 10 secures to the welding machine via a bracket 11 provided on a frame 13 of the attachment 10. The invention is the seam fitter attachment 10 that attaches to an existing automatic welder 12 and the combination thereof.

The seam fitter attachment device 10 automates cleaning of the plate edges 16 employing a power wire brush 18 that is provided on the leading or front end 17 of the attachment 10. The purpose of the wire brush is to prepare the edges 16 for welding by removing rust and pits from the edges 16. It may be desirable to have a flow of air to blow away any stray particles from edges 16 and away from the attachment 10 to prevent any metal particles from being attracted to the magnetic wheels 22 of the attachment 10 that are located rearward of the brush 18. Although two magnetic wheels 22 are shown, in some embodiments only one magnetic wheel 22 may be included. In other embodiments, more than two magnetic wheels 22 may be included.

Figure 4:
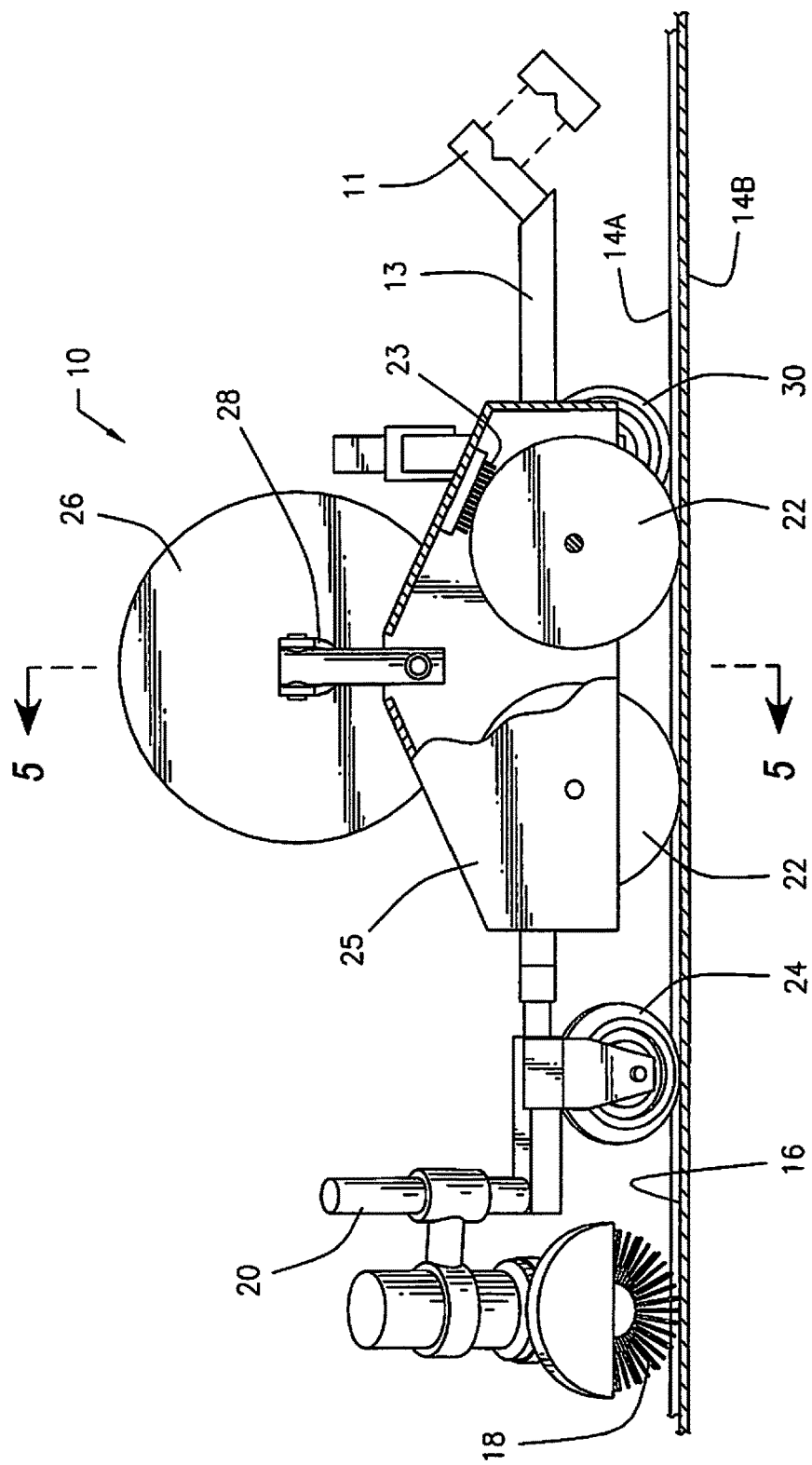
FIG. 4 a left side view of the seam fitter attachment of FIG. 1.

Referring to FIG. 4, for any particles that may become attracted to the magnetic wheels 22, cleaning brushes 23 provided in the housing 25 surrounding the magnetic wheels 22 that are designed to engage and clean those particles off of the magnetic wheels 22 so that the magnetic wheels 22 remain clean and able to make good contact with the bottom plate 14B.

Immediately behind the brush 18 and between the brush 18 and the magnetic wheels is a guide wheel 24. The guide wheel 24 is adjustable in its angular orientation relative to the plates 14A and 14B. Angular adjustment of the guide wheel 24 allows the guide wheel 24 to be adjusted to about a 45 degree angle when lap welding plates 14A and 14B so that the guide wheel 24 runs along the overlapping plate edge 16. Alternately, if the attachment 10 is employed to do butt welding, the guide wheel 24 will be adjusted to about a 90 degree angle relative to the welding plates 14A and 14B so that the guide wheel 24 runs on top of the abutting edges 16 of the adjacent plates 14A and 14B. The purpose of the guide wheel is to keep the attachment in proper alignment relative to the plates 14A and 14B that are being fitted and either tacked or continuously welded together.

Figure 5:
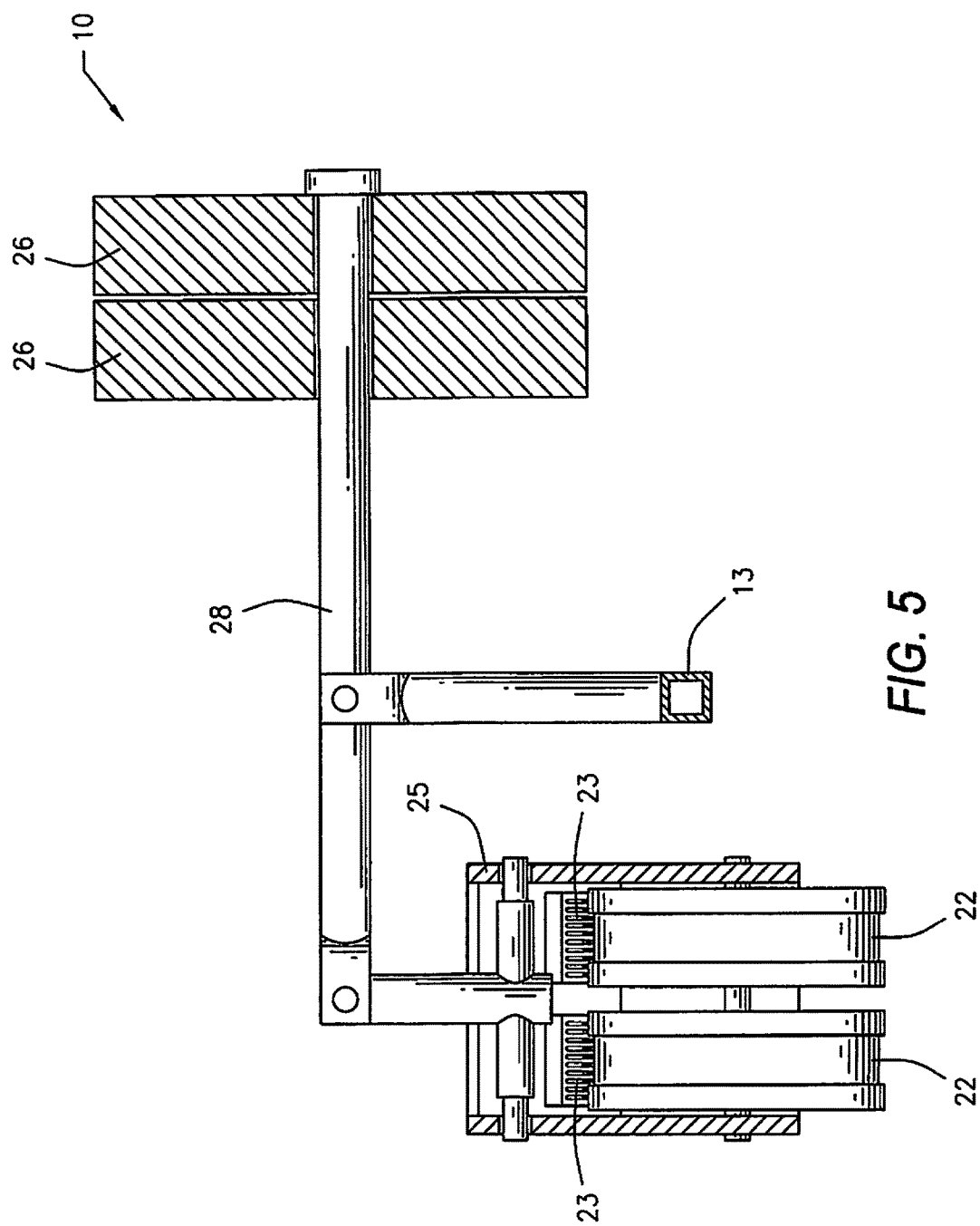
FIG. 5 is a cross sectional view of the seam fitter that is taken along line 5-5 of FIG. 4.

Referring now to FIGS. 4 and 5, the seam fitter attachment device 10 moves along the top of plates 14A and 14B and is propelled manually or by a drive mechanism provided on the welding machine 12 to which it is designed to be attached. As previously described, the attachment 10 is aligned by the guide wheel 24 with the edge 16 of the top plate 14A of the plates 14A and 14B being tacked or welded together.

Immediately behind the guide wheel 24 are the magnetic wheels 22 that employ permanent or electromagnets effective to mechanically force tight plate alignment prior to the plates 14A and 14B being tacked or welded. The welding machine 12 rests on the top plate 14A and the magnetic wheels 22 are magnetically attracted to the bottom plate 14B. As shown in FIG. 5, a weight 26 secured to the magnetic wheels 22 via a lever 28 assists the magnetic wheels 22 in raising the bottom plate 14B into tight engagement with the top plate 14A so it can be welded. The weight 26 may be adjusted.

A middle wheel 30 is provided on the attachment 10 that rests on the top 14A plate and aids in holding the top plate 14A down as the magnetic wheels 22 lift the bottom plate 14B upward toward the top plate 14A. The weight of the welding machine 12 resting on the top plate 14A also helps to hold the top plate 14A down in this process. Middle wheel 30 may be a vertically adjustable wheel.

Once the plates 14A and 14B are properly aligned, the magnetic wheels 22 hold the top and bottom metal plates 14A and 14B tightly together while they are being tacked or welded by the welder 12.

The seam fitter attachment device 10 can be adjusted so it can align different profiles such as lapped, or butted plates 14A, 14B, 14C, etc. of any plate thickness. The attachment 10 provides for plate edge cleaning, tight fitting, and tacking or welding of metal lap or butt welded seams.

In embodiments, the middle wheel 30 and magnetic wheel 22 may be aligned relative to one another so that there is no overlap, with wheel 30 on one side of welding line and wheel 22 on the other side. For example, middle wheel 30 may be located toward one side of the frame 13 and the magnetic wheel 22 may located on the opposite side of the frame 13 such that the welding line passes between the two wheels 30, 22.

While embodiments have been described with a certain degree of particularity, changes may be made in the details of construction and the arrangement of components without departing from the spirit and scope of this disclosure. It is understood that the invention is not limited to the embodiments described herein, but is to be limited only by the scope of the attached claim or claims, including the full range of equivalents to which each element is entitled.

What is claimed:

1. A method of automatically fitting a seam between two metal plates for welding; the method comprising:
    moving a tractor welder including a seam fitter attachment along a top of two metal plates to be welded together along a seam;
    wherein the seam fitter attachment includes:
    a frame having a forward end and a rearward end, the rearward end of the frame configured for attachment to the tractor welder;
    at least one magnetic wheel located between the forward and the rearward end of the frame, the at least one magnetic wheel including a magnet; and
    a lever arm connected to the at least one magnetic wheel, the lever arm configured to apply a vertically upward force to the at least one magnetic wheel when the seam fitter attachment is in a down flat welding position and when the seam fitter is in a horizontal welding position.

2. The method of claim 1, wherein the first metal plate partially overlaps a second metal plate.

3. The method of claim 2, further comprising:
    magnetically attracting a portion of the second metal plate toward the first metal plate, the portion of the second metal plate being located below the at least one magnetic wheel.

4. The method according to claim 1, further comprising:
    aligning the first metal plate in a horizontal plane by adjusting the vertically upward force on the at least one magnetic wheel.

5. The method of claim 1, further comprising:
    aligning a second metal plate of the two metal plates in a horizontal plane by adjusting a vertically downward force on the second metal plate.

6. The method of claim 5, wherein the vertically downward force is applied through a vertically adjustable wheel located on a side of the frame opposite that of the at least one magnetic wheel.

7. The method of claim 1, further comprising:
    brushing a periphery of the magnetic wheel during the moving of the seam fitter attachment.

8. The method of claim 1, further comprising:
    aligning the two metal plates into proper alignment with one another by adjusting a counter weight connected to the lever arm.

9. The method of claim 1, further comprising:
    cleaning the seam between the two metal plates during the moving of the seam fitter attachment.

10. The method of claim 9, wherein the cleaning the seam includes brushing with a wire brush located at the forward end of the frame.

11. The method of claim 10, wherein the wire brush is a powered wire brush.

12. The method of claim 1, wherein the seam fitter attachment further includes a vertically adjustable wheel located on a side of the frame opposite that of the at least one magnetic wheel.

13. The method of claim 1, wherein the seam fitter attachment further includes a housing, the housing containing a least a portion of the at least one magnetic wheel.

14. The method of claim 13, wherein the housing includes a brush, the brush arranged to engage a periphery of the at least one magnetic wheel.

15. A method of automatically fitting a seam between two metal plates for welding; the method comprising:
    moving a tractor welder including a seam fitter attachment along a top of two metal plates to be welded together along a seam;
    the seam fitter attachment including:
    a frame having a forward end and a rearward end, the rearward end of the frame configured for attachment to a tractor welder;
    at least one magnetic wheel located between the forward and rearward ends of the frame, the at least one magnetic wheel including a magnet;
    a vertically adjustable wheel located between the forward and rearward ends of the frame on a side of the frame opposite that of the at least one magnetic wheel;
    a housing containing at least a portion of the at least one magnetic wheel and containing at least one brush, the brush configured to contact a respective periphery of the magnetic wheel;
    a lever arm connected to the at least one magnetic wheel on one end and a counterweight on another end, the lever arm configured to apply a vertically upward force on the at least one magnetic wheel when the seam fitter attachment is in a down flat and when the seam fitter attachment is in a horizontal welding position; and
    a brush located at the forward end of the frame.

* * * * *